L. HORN.
MOTOR DRIVEN IMPLEMENT.
APPLICATION FILED NOV. 28, 1911.

1,044,655.

Patented Nov. 19, 1912.
2 SHEETS—SHEET 1.

WITNESSES
C. N. Davis
L. B. Aveilhé

Lafayette Horn
INVENTOR

By Thomas R. Harris
Attorney

L. HORN.
MOTOR DRIVEN IMPLEMENT.
APPLICATION FILED NOV. 28, 1911.

1,044,655.

Patented Nov. 19, 1912.
2 SHEETS—SHEET 2.

WITNESSES
C. T. Davis
L. B. Aveilhé

Lafayette Horn
INVENTOR
By Thomas R. Harvey
Attorney

UNITED STATES PATENT OFFICE.

LAFAYETTE HORN, OF CHOICE, TEXAS.

MOTOR-DRIVEN IMPLEMENT.

1,044,655.  Specification of Letters Patent.  Patented Nov. 19, 1912.

Application filed November 28, 1911. Serial No. 662,872.

*To all whom it may concern:*

Be it known that I, LAFAYETTE HORN, a citizen of the United States, residing at Choice, in the county of Shelby and State of Texas, have invented certain new and useful Improvements in Motor-Driven Implements, of which the following is a specification.

My invention relates to improvements in plows and similar agricultural implements, and is designed to be used as a plow, a cultivator, or a planter, the employment of various attachments for these different purposes being required to convert one implement into another.

The object of the invention is the provision of a motor-driven implement of this type which may be manipulated and guided with facility by the plowman, which is simple in construction and operation, comparatively cheap in first cost, durable, and capable of conversion for use in a variety of different ways.

The invention consists essentially in the novel combinations and arrangements of parts as hereinafter set forth and claimed.

In the accompanying drawings I have illustrated one example of the physical embodiment of my invention constructed according to the best mode I have so far devised for the practical application of the principles.

Figure 1:
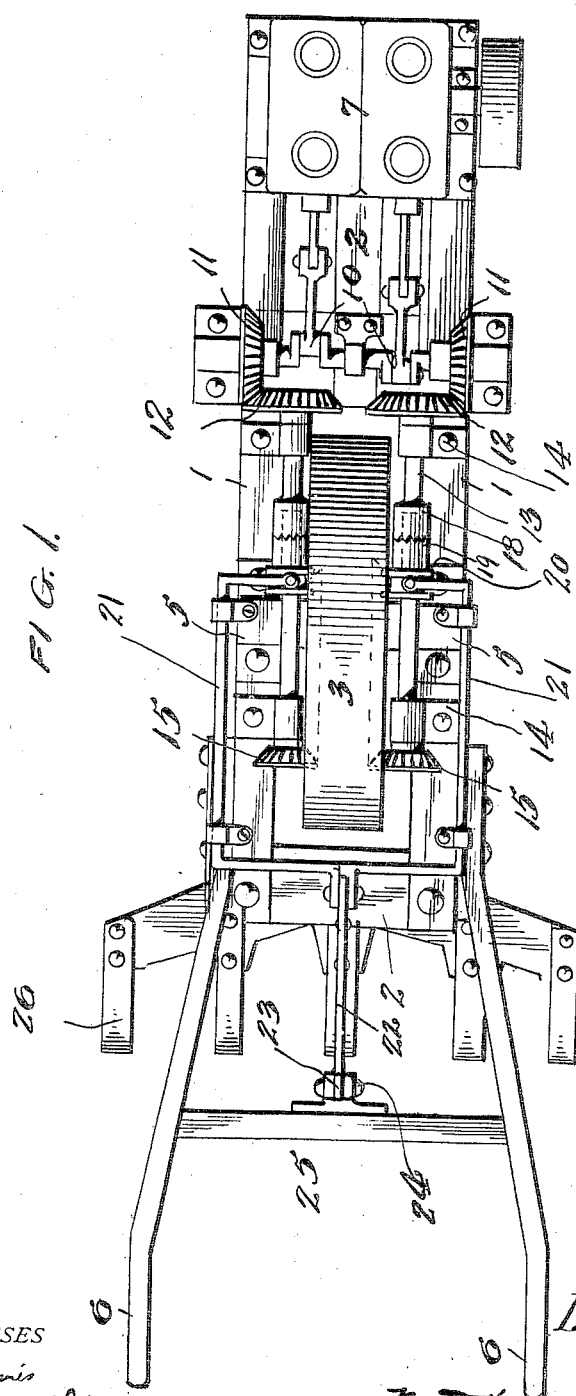
Figure 2:
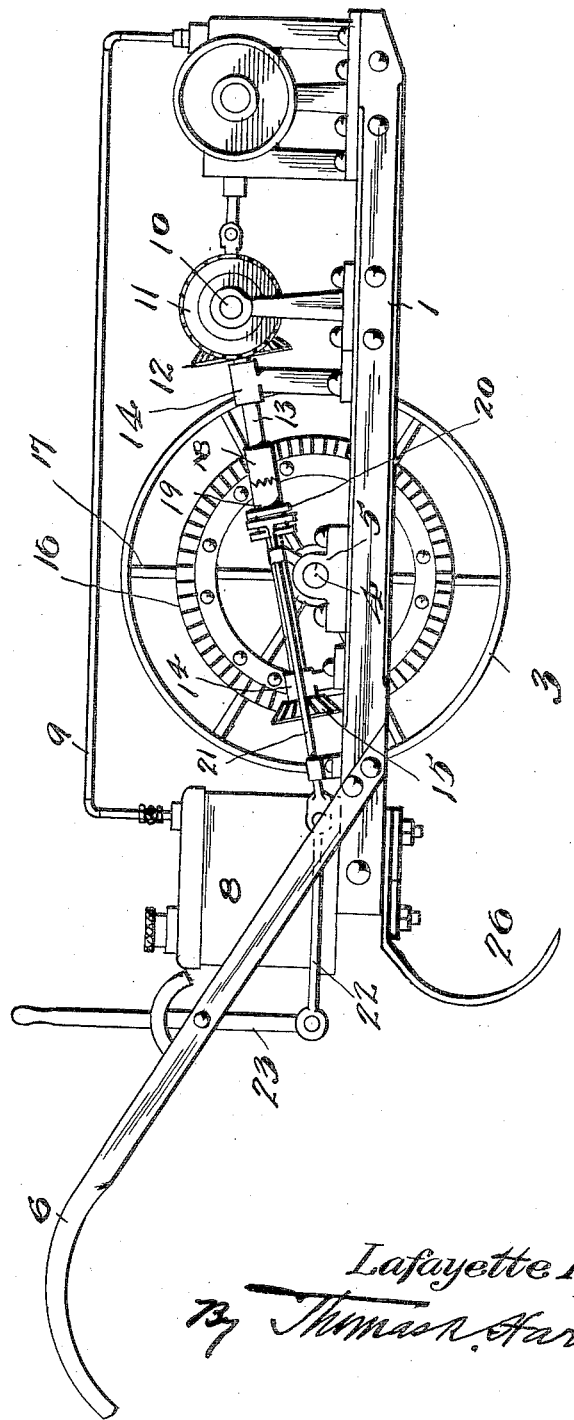

Figure 1 is a plan view of an agricultural implement illustrating my invention. Fig. 2 is a side elevation of Fig. 1, with the addition thereto of a fuel tank and connections.

In the exemplifying structure illustrating the invention in the drawings I have utilized a cultivator, but it will be understood that the invention contemplates the use of other attachments in lieu of the cultivator attachment shown, the latter being here used for purposes of convenience in showing and describing the invention.

The motor driven implement in its preferred embodiment is supported upon a rectangular frame, including a pair of horizontal side beams 1 and end connections 2, 2. The frame is suspended or hung upon the large single traction wheel 3 by means of the axle 4 and bearings 5, 5, and at the rear are fastened the upwardly and rearwardly extending plow handles 6, 6, for guiding the implement.

At the front end of the frame is located the motor, 7, which as illustrated in the present instance comprises a pair of internal combustion engines, which receive fuel from the tank 8 at the rear of the implement, by connecting pipe 9. These engines which comprise the motor may be increased in number, but for convenience I have illustrated only two, and these are connected to the traction wheel 3 from their cranks 10, through duplicate connections, at each side of the traction wheel, comprising the pair of bevel gears 11, 12, the shaft 13, supported in bearings 14 on the side beams, and the bevel gear 15, which meshes with the large wheel 16, attached to the spokes 17 of the traction wheel 3. Through these connected parts the traction wheel 3 is rotated from the motor 7.

The driving motor may be disconnected from the driven mechanism by means of the clutch mechanism illustrated, one for each engine and comprising a clutch member 18 adapted to be engaged by the complementary member 19, whose spool 20 may be moved on the shaft 13 by means of the forked U-shaped draw bar 21 to which the link 22 is connected. The other end of the link is pivotally connected to the lower end of the actuating lever 23 which lever is suitably fulcrumed, at 24 to the cross bar 25 of the handles. With the parts as shown in Fig. 2 of the drawings, the forward movement of the upper end of the actuating lever will disconnect the clutch members, and render the connection between the driving mechanism and the driven mechanism, inoperative.

As hereinbefore stated the implement as illustrated is adapted to be used as a cultivator, the spring tooth attachment 26, serving the functions of a cultivator.

One of the most advantageous and meritorious features of the implement as illustrated is the ease with which the implement may be steered. This feature is due to the fact that the entire implement is supported at a single point on the one traction wheel 3. This single point of support permits the plowman who guides the implement by holding the handles 6, to turn the implement with facility when he has reached the end of a row, or if plowing upon a circular field, the plow may be held to its steady course without difficulty or excessive exertion.

I desire it to be understood that the implement may be used for a variety of purposes, as for instance in breaking land, cultivating land, or planting, and that various implements may be attached to the frame for performing the functions required upon farm land.

Having thus fully described my invention, what I claim is:—

The combination with a single supporting wheel of a rectangular frame comprising side bars and front and rear end bars, and journal bearings on said side bars for the shaft of the supporting wheel, a motor located at the front of the frame and including two engines, a gear wheel on each side of the supporting wheel, and mechanism connecting an engine with each gear wheel for driving the supporting wheel, and handles connected to the frame at the rear whereby the wheel may be steered and the frame balanced.

In testimony whereof I affix my signature in presence of two witnesses.

LAFAYETTE HORN.

Witnesses:
J. H. COBB,
J. E. NICHOLSON.